G. T. LINCOLN.
Milking-Pails.

No. 139,679.

Patented June 10, 1873.

Witnesses.
S. N. Piper
L. N. Heller

Geo. T. Lincoln,
by his attorney,
R. Uldy

UNITED STATES PATENT OFFICE.

GEORGE T. LINCOLN, OF LEOMINSTER, MASSACHUSETTS.

IMPROVEMENT IN MILKING-PAILS.

Specification forming part of Letters Patent No. 139,679, dated June 10, 1873; application filed April 11, 1873.

*To all whom it may concern:*

Be it known that I, GEORGE T. LINCOLN, of Leominster, of the county of Worcester and State of Massachusetts, have invented a new and useful Improvement in Milking-Pails; and do hereby declare the same to be fully described in the following specification and represented in the accompanying drawings, of which—

Figure 1:
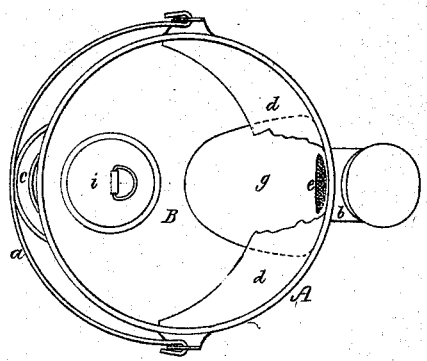
Figure 2:
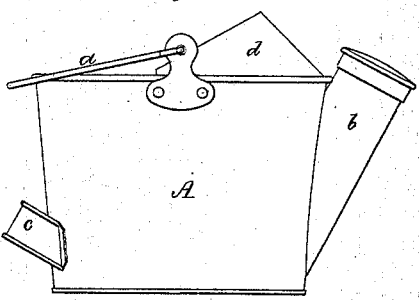
Figure 3:
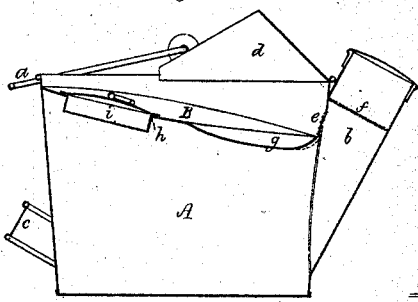

Figure 1 denotes a top view, Fig. 2 a side elevation, and Fig. 3 a longitudinal section, of one of my improved pails.

In such drawings, A denotes a conical vessel or pail, provided with a bail, *a*, a discharging nose or spout, *b*, a handle, *c*, and a top guard, *d*, all arranged as represented. Within the upper part of the pail is an inclined dished cap or cover, B, fixed along its entire edge to the inner surface of the pail. Between the spout and the lower part of the edge of the cover is an opening through the side of the pail, leading into the spout *b*, such opening being provided with a strainer, *e*, and within and extended across the spout, and above the said strainer, is another strainer, *f*. In rear of the strainer *e*, and next to it, the cover B is provided with a concavity, *g*, sunk below the strainer *e*, and back of such concavity there is an inlet or hole, *h*, through the cover B, such hole being furnished with a cover, *i*, all being as represented. The purpose of the concavity *g* is to receive the milk as it is discharged from the teat of a cow, and to hold a portion thereof in order to prevent the foreign matters from being driven through the strainer by the force of the stream. The milk rising in the concavity will flow through the strainer *e* down into that part of the pail which is below the dished cap. On tipping the pail the milk may be discharged therefrom through the spout and its strainer, and thus will be twice strained in passing into and out of the pail. The opening through the dished cap is to enable a person to insert his arm into the body of the pail or part beneath the cap for cleansing such, the spout, and its strainer, as occasion may require, the opening being kept covered during the milking process. One great merit of this pail is, that if upset by the cow or by accident, there is little or no liability of loss of milk.

I claim—

1. In the milking-pail, the two strainers *e f*, the discharging-spout, and the dished cover B, combined and arranged as specified.

2. The dished cover B, made with the inlet or opening *h* and the milk-receiving recess or concavity *g*, arranged together, and with the strainer *e*, as set forth.

3. The milk-pail provided with the stationary cap B, the two strainers *e f*, the inlet *h*, and the milk-receiving cavity *g*, all arranged, with the pail body and spout, substantially as explained and represented.

GEO. T. LINCOLN.

Witnesses:
R. H. EDDY,
J. R. SNOW.